United States Patent [19]

Moscovici

[11] Patent Number: 4,679,130
[45] Date of Patent: Jul. 7, 1987

[54] PROGRAMMABLE POWER SUPPLY

[75] Inventor: Poldi Moscovici, Woodcliff Lake, N.J.

[73] Assignee: Superior Manufacturing & Instrument Corporation, Maspeth, N.Y.

[21] Appl. No.: 870,379

[22] Filed: Jun. 4, 1986

[51] Int. Cl.$^4$ ............................................. H02M 3/335
[52] U.S. Cl. ....................................... 363/17; 363/89; 363/98; 323/266
[58] Field of Search .................. 363/17, 41, 89, 98, 363/86; 323/266, 285, 322, 351

[56] References Cited

U.S. PATENT DOCUMENTS

| | | | |
|---|---|---|---|
| 3,517,301 | 6/1970 | Huber | 323/285 |
| 3,879,652 | 4/1975 | Billings | 323/322 X |
| 4,300,191 | 11/1981 | Baranowski et al. | 363/17 |
| 4,322,817 | 3/1982 | Kuster | 363/41 X |
| 4,390,940 | 6/1983 | Corbefin et al. | 363/98 X |
| 4,442,339 | 4/1984 | Mizuno et al. | 323/285 X |
| 4,586,119 | 4/1986 | Sutton | 363/17 |

Primary Examiner—Patrick R. Salce
Assistant Examiner—Marc S. Hoff
Attorney, Agent, or Firm—George H. Gerstman

[57] ABSTRACT

A programmable power supply is disclosed which combines a linear power supply with a switching power supply. The switching power supply includes a pulse width modulator, a main power transformer, and a DC to AC inverter which is responsive to the pulse width modulator for varying the input to the main power transformer. The linear power supply includes a FET that is coupled to the output of the switching power supply. The FET is controlled in response to a feedback signal representing the output of the FET and also a voltage programming signal representing the voltage to be programmed. The pulse width modulator is controlled in response to the feedback signal representing the output of the FET and also a feedback signal responsive to the voltage drop across the FET. The output from the switching power supply, which is fed to the FET, is controlled in response to the output from the pulse width modulator.

30 Claims, 5 Drawing Figures

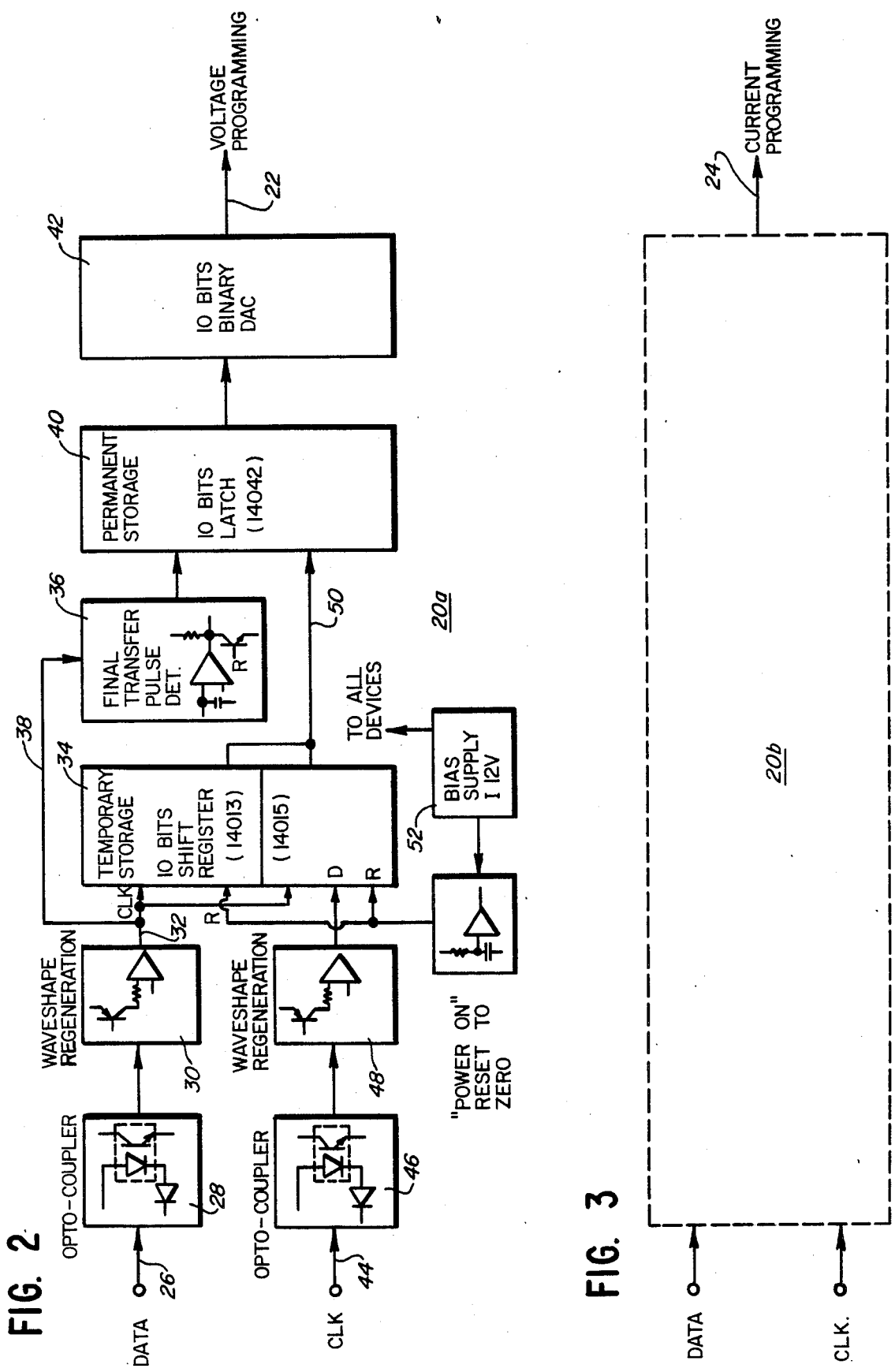

PROGRAMMABLE POWER SUPPLY

FIELD OF THE INVENTION

The present invention concerns a novel programmable power supply.

BACKGROUND OF THE INVENTION

Programmable power supplies which are known in the art typically use a keyboard control through an IEEE 488 bus. By using a programmable power supply, the voltage and current parameters may be controlled by an operator, instead of requiring the use of a number of different power supplies to obtain various voltages and currents. Typically, programmable power supplies comprise linear power supplies in which, in order to control the output voltage, a negative feedback loop is used to vary the conduction of the active element. The linear power supply has the advantage that it is relatively efficient and provides a very clean output. However, the linear power supply has the disadvantage that it requires a line transformer to reduce the line voltage significantly and the linear power supply is relatively inefficient and heavy compared to a switching power supply, although the linear power supply provides a cleaner performance.

A switching power supply generally is significantly smaller than a linear power supply and typically uses relatively high frequency pulses so that lightweight magnetics may be used. However, the switching power supply does not provide an output that is as clean as the linear power supply and thus, where a clean output is required, a linear power supply is typically used although it is less efficient, more expensive and heavier.

It is an object of the present invention to combine the advantages of a switching power supply with the advantages of the linear power supply, in a programmable system.

Other objects and advantages of the present invention will become apparent as the description proceeds.

SUMMARY OF THE INVENTION

In accordance with the present invention, a programmable power supply is disclosed which comprises a switching power supply having an output and a linear power supply having an output. The switching power supply includes a pulse modulator, a main power transformer, and means responsive to the pulse modulator for varying the input to the main power transformer. The linear power supply includes an active element coupled to the output of the switching power supply.

First feedback means are responsive to the output of the active element for providing a first feedback signal. A voltage programming signal is provided that represents the voltage to be programmed. The active element is controlled in response to the first feedback signal and the voltage programming signal.

Means are provided for controlling the pulse width modulator. There are second feedback means for providing a second feedback signal responsive to the voltage drop across the active element. The pulse width modulator controlling means is responsive to the first feedback signal and the second feedback signal. Means are provided for controlling the output from the switching power supply in response to the output from the pulse width modulator.

In a preferred embodiment, the active element of the linear power supply comprises a FET with the output from the main power transformer being coupled to the source/drain circuit of the FET and with means for controlling the active element being coupled to the gate of the FET. The first feedback means includes an open loop protection circuit.

In the illustrative embodiment, the means for controlling the active element comprises a voltage comparator and a drive circuit. Means are provided for feeding the first feedback signal to one input of the voltage comparator and means are provided for feeding the voltage programming signal to another input of the voltage comparator. The output of the voltage comparator is fed to the drive circuit and means are provided for feeding the output of the drive circuit to the control electrode of the active element.

In the illustrative embodiment, the second feedback means comprises an electrical line connected to the input of the active element for feeding a signal representative of the voltage drop across the active element to the voltage comparator. The second feedback means also includes a voltage divider in series with the electrical line.

In the illustrative embodiment, the pulse modulator includes a pulse width modulator. The means for controlling the pulse width modulator comprises means for modulating the duty cycle of the output voltage from the pulse width modulator to thereby vary the output voltage from an AC to DC inverter which is controlled by the pulse width modulator.

In the illustrative embodiment, a current programming signal is provided which represents the current to be programmed. The output current of the power supply is sensed and a third feedback signal is provided that is responsive to the current programming signal and the output current. Means are provided for controlling the active element in response to the third feedback signal.

A more detailed explanation of the invention is provided in the following description and claims, and is illustrated in the accompanying drawings.

BRIEF DESCRIPTION OF THE DRAWINGS

FIG. 2 is a block diagram of a power supply programmer constructed in accordance with the principles of the present invention;

FIG. 3 is a representation of a power supply programmer that is intended to be identical to the power supply programmer of FIG. 2, except that the output from FIG. 3 is a current programming signal wherein the output from FIG. 2 is a voltage programming signal.

DETAILED DESCRIPTION OF THE ILLUSTRATIVE EMBODIMENT

Figure 1:
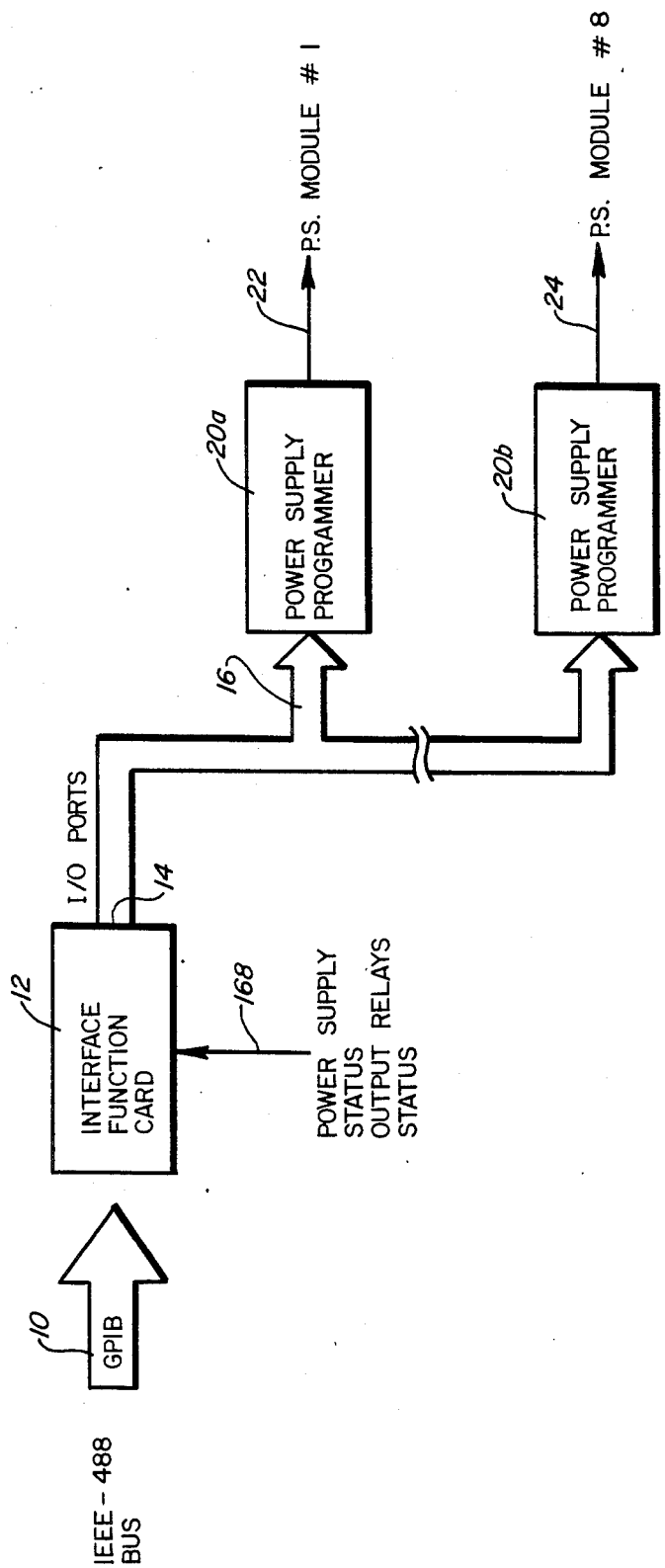
FIG. 1 is a block diagram of a programmable power supply interface.

Referring to FIG. 1, a keyboard (not shown) provides programming data in ASCII, as is well-known in the art, via an IEEE 488 bus 10 to an interface function card 12. At the I/O ports 14 of interface function card 12, the data pulses and clock pulses are fed via bus 16 to a power supply programmer 20a and a power supply programmer 20b. Power supply programmer 20a provides voltage programming signals on line 22 and power supply programmer 20b provides current programming signals on line 24.

The power supply programmers 20a and 20b are illustrated in FIGS. 2 and 3. FIG. 3 is similar to FIG. 2 except that the power supply programmer 20b of FIG. 3 provides current programming signals while the power supply programmer 20a provides voltage programming signals.

Referring to FIG. 2, data pulses are fed via line 26 to opto coupler 28 from which they are fed to a wave-shape regeneration circuit 30. The opto coupler 28 is utilized for isolation. The regenerated waveform is fed via line 32 to a temporary storage and shift register 34. A final transfer pulse detector 36 is used and receives the regenerated wave-shape data via line 38, to determine that the total number of bits have been transferred. From the final transfer pulse detector, the bits are fed to a permanent storage circuit 40 comprising a 10 bits latch. The data is then fed to a 10 bit binary digital to analog converter 42 where it outputs for voltage programming via line 22.

Likewise, the clock pulses are fed via line 44 to opto coupler 46 for isolation, and then are regenerated by wave-shape regeneration circuit 48 and fed to the 10 bits shift register 34. Shift register 34 outputs via line 50 to 10 bits latch 40. The shift register is powered by a bias supply 52 which is a 12 volt power supply also utilized to bias various devices in the system.

The voltage programming signal on line 22 is an analog signal which represents the desired programming. For example, if the desired programming is intended to be for 0.7 volts to 10 volts in 10 millivolt steps, the analog signal may provide 0 volts to 10 volts signal, representing the minimum to maximum voltage that is to be programmed for one of the modules. Each power supply programmer would be providing a selected voltage programming signal which is an analog signal representing the particular voltage that is to be programmed for the particular module, although it is understood that the voltage programming signal on line 22 would not typically be equal to the particular voltage that is to be programmed but would instead represent it.

With respect to FIG. 3, the current programming signal on line 23 is an analog signal representing the current to be programmed. For example, if it desired for the current to be 25 amps, an analog voltage signal, representative of 25 amps, will be provided on line 24.

Figure 4A:
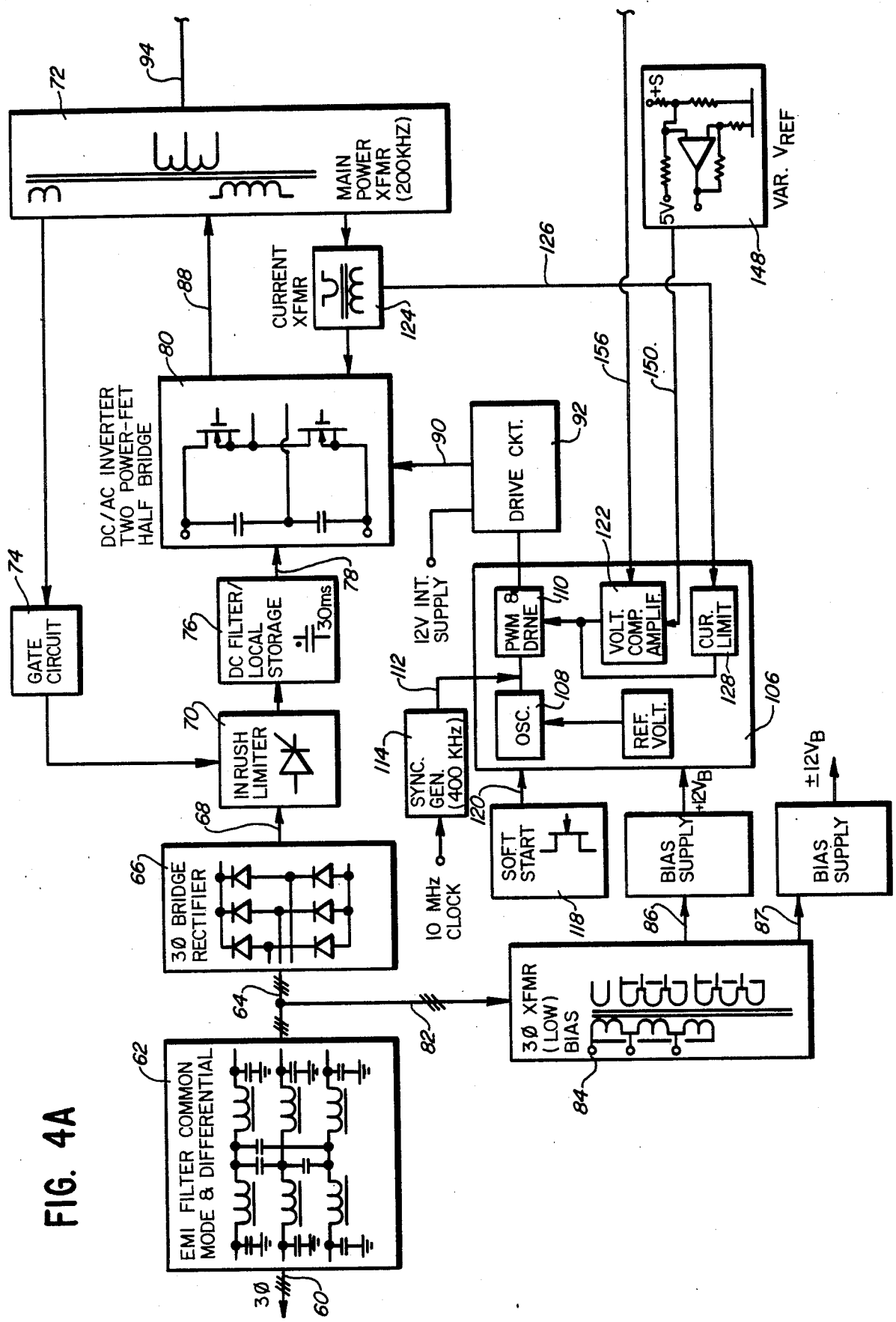
FIG. 4A and FIG. 4B, when connected together, comprise a schematic circuit diagram of a programmable power supply constructed in accordance with the principles of the present invention.
Figure 4B:
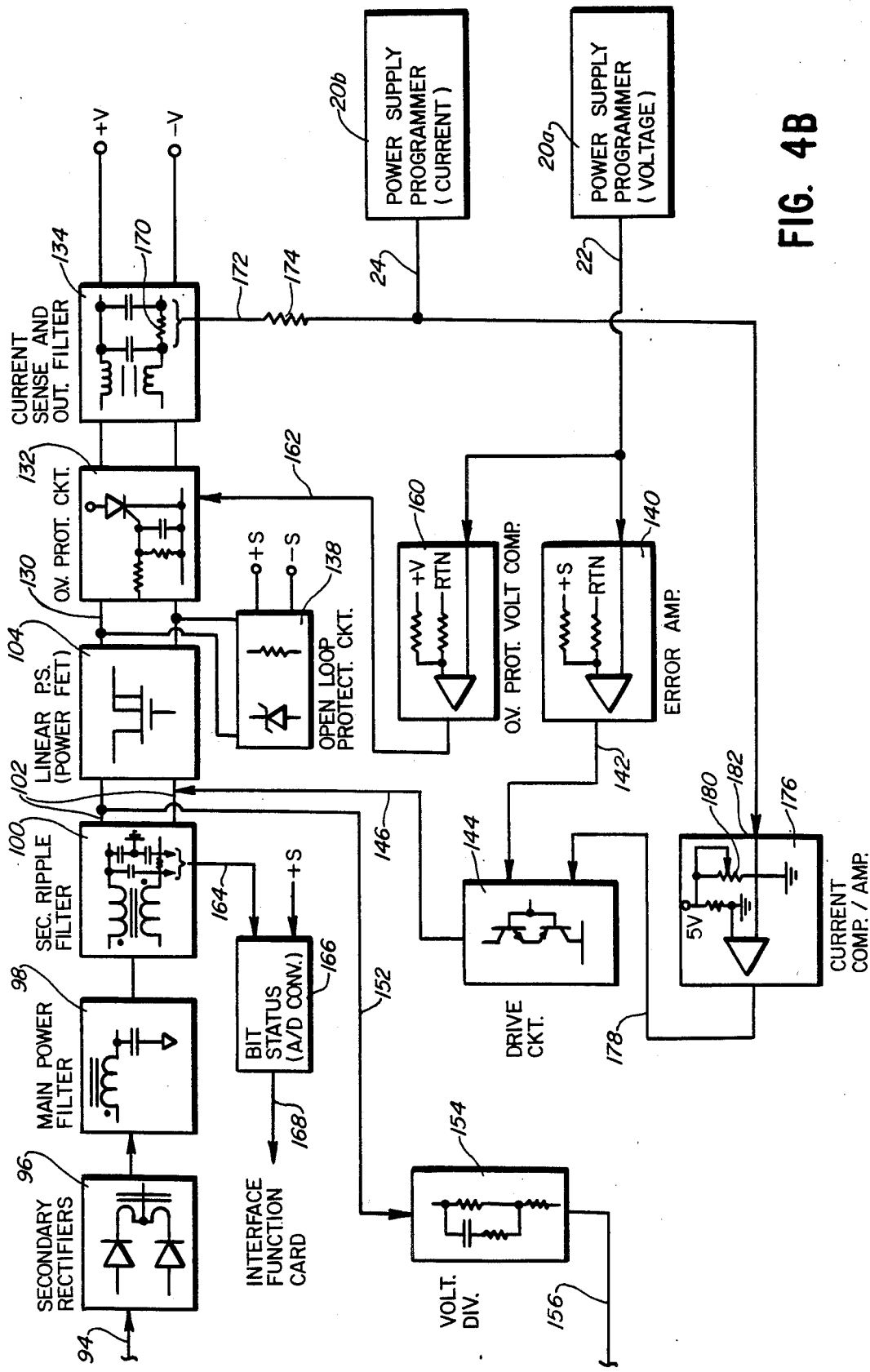

FIGS. 4A and 4B show the power supply system of the present invention, which receives the voltage programming signal from line 22 and the current programming signal from line 24, as indicated on the right-hand side of FIG. 4B.

The power supply of FIGS. 4A and 4B comprises a combination switching power supply and linear power supply. The main portions of the switching power supply are illustrated in FIG. 4A. Referring to FIG. 4A, input line 60 is connected to a suitable source of 3 phase alternating current. The AC is fed through a conventional EMI filter circuit 62 and the filtered AC is fed via line 64 to a 3 phase bridge rectifier 66 where it is rectified and fed via line 68 to an inrush limiter comprising an SCR, the gate of which has a feedback voltage from the main power transformer 72 via gate circuit 74. The output of the SCR (inrush limiter 70) is fed to a DC filter 76 through which it is fed via line 78 to a DC to AC inverter 80.

The current from filter 62 is also fed via line 82 to a transformer 84 to provide bias voltages as required via lines 86, 87 and others.

DC to AC inverter 80 provides high frequency square waves to the primary winding of main power transformer 72 via line 88. The output of main power transformer 72 from its secondary is relatively high frequency voltage which is fed via line 94 to secondary rectifiers 96 (FIG. 4B), to a main power filter 98 and to secondary ripple filter 100 for futher smoothness. The output 102 of the secondary ripple filter 100 is coupled to in input of linear power supply 104, which will be discussed in more detail below.

Referring back to FIG. 4A, the switching power supply includes a pulse width modulation circuit 106 comprising an oscillator 108, the output of which is coupled to pulse width modulator and drive 110. Pulse width modulator and drive 110 is also provided with a 400 kilohertz signal via line 112 by synchronous generator 114 which is driven by a 10 megahertz clock. The output square waves from pulse width modulator 110 are fed via line 116 to drive circuit 92, which provides square waves via line 90 to inverter 80. As stated above, the energy output of inverter 80 on line 88 is responsive to the duty cycle of the pulses on line 90.

The switching power supply has a soft start circuit 118 which ramps the output voltage to protect DC to AC inverter 80. This ramped output voltage is fed via line 120 to pulse width modulator circuit 106.

The pulse width modulator circuit 106 also comprises a first voltage comparator/amplifier 122 which receives signals from the linear power supply as will be discussed below. A current transformer 124 is provided for current protection to the DC to AC inverter 80 and there is a feedback line 126 from the current transformer 124 to provide a feedback signal to current limiting circuit 128.

Now referring to FIG. 4B, linear power supply 104 preferably comprises a power FET in which the output of the secondary ripple filter 100 is fed via lines 102 to the source/drain circuit of the FET and the output from the source/drain circuit is fed via lines 130 to an overvoltage protection circuit 132. The output from the overvoltage protection circuit is fed to a current source and output filter circuit 134 which provide the regulated output voltage +V, −V.

The linear power supply may, if desired, comprise a bipolar transistor in which the input/output circuit to the linear power supply comprises the emitter/collector circuit of the transistor. However, a power FET is preferred because of the lower voltage drop that is required.

At the output 130 of the linear power supply, there is a first feedback line comprising an electrical line 136 connected to an open loop protection circuit 138 having an output voltage +S, −S, which comprises a first feedback signal.

Open loop protection circuit 138 is a conventional open loop protection circuit including a Zener diode, in which if line 136 is broken there is an open loop and the loop is clamped using the Zener diode, to prevent any overvoltage.

This first feedback signal is fed to one input of error amplifier (voltage comparator) 140, another input of which is connected to output line 22 from a power supply programmer 20a whereby the voltage programming signals are provided on line 22 to the other input of comparator 140. The output from comparator 140 is fed via line 142 to a drive circuit 144 which is connected via line 146 to the gate of the power FET of linear power supply 104.

The first feedback signal +S is also fed to a variable voltage reference circuit 148 (FIG. 4A). The output of the variable voltage reference circuit 148 is coupled via line 150 to an input of voltage comparator/amplifier 122.

A second feedback line comprises an electrical line 152 (FIG. 4B) connected to the input of the linear power supply 104, a voltage divider 154, and electrical line 156 connected to another input of voltage comparator/amplifier 122 (FIG. 4A). Thus the first feedback signal +S is responsive to the output of linear power supply 104 while the second feedback signal on line 152 is responsive to the voltage drop across the active element of the linear power supply, i.e., the power FET.

The voltage programming signal on line 22 is also fed to an input of overvoltage protection/voltage comparator circuit 160. The output voltage +V is fed to another input of the comparator 160. The output of comparator 160 is fed via line 162 to overvoltage protection circuit 132, as illustrated in FIG. 4B.

Current from secondary ripple filter 100 is fed via line 164 to a bit status circuit comprising and A to D converter 166. The output of A to D converter 166 is fed via line 168 to interface function card 12 (FIG. 1) to provide the power supply status to the interface function card.

It is seen that the output +S from the linear power supply is sensed and fed back to voltage comparator 122. Likewise, the voltage sensed at the input to the linear power supply is fed back to the voltage comparator 122. At the same time, the conductivity of the active element within the linear power supply is controlled in accordance with the feedback signal representing the output voltage from the linear power supply and also the voltage programming signal, by means of comparator 140 which utilizes drive circuit 144 to control the conductivity of the active element via line 146.

The voltage comparator 122, which is receiving a feedback voltage from the linear power supply that represents its output and is also receiving another voltage that represents the drop across the active device of the linear power supply, compares these voltages and provides a signal for modulating the duty cycle of the pulse width modulator 110. As stated above, the duty cycle of the square wave from pulse width modulator 110 is effectively utilized to provide the appropriate energy to the primary of main power transformer 72. In other words, the feedback signal which is representative of the actual output voltage of the linear power supply and the signal which represents the voltage drop across the active device of the linear power supply are used to vary the duty cycle of the waveform that is rectified and then is fed to the linear circuit. If there is a low duty cycle, once rectified there will be a lower voltage than if the duty cycle were higher. The switching power supply is thus combined with the linear power supply with the switching power supply receiving feedback information relating to the output voltage and the drop across the active device of the linear circuit so as to control the pulse width modulation. This enables the programming signal to vary and if the programming signal varies, there will be a change in the duty cycle in response thereto by the pulse width modulator.

Referring again to FIG. 4B, the current programming operates as follows. There is a current sensing resistor at the output of current sense circuit 134. A current signal is provided via line 172 and via resistor 174 to a current comparator/amplifier 176. The output from comparator/amplifier 176 is fed via line 178 to drive circuit 144, for controlling the gate of the FET of linear power supply 104. Comparator/amplifier 176 can be adjusted by means of potentiometer 180. By adjusting potentiometer 180, the voltage reference at the top input to the amplifier can be determined while with the programming signal from line 24 the current limits that are desired are determined by providing the current programming signal to input 182 of the current comprator/amplifier 178.

Thus, in a similar manner that the voltage programming signal is being provided to an input of error amplifier 140 to effectively control the conductivity of the FET, for the current the current programming signal is provided to input 182 for effectively controlling the conductivity of the FET. In accordance with the principles of the present invention, both current parameters and voltage parameters may be controlled by the power supply and the output voltage and current from the power supply of the instant invention is clean as if it were produced by a linear power supply, although it is not necessary to use a heavy transformer as is normally required by a linear power supply. In other words, the advantages of the switching power supply are combined with the advantages of a linear power supply without all of its disadvantages.

Although an illustrative embodiment of the invention has been shown and described, it is to be understood that various modifications and substitutions may be made by those skilled in the art without departing from the novel spirit and scope of the present invention.

What is claimed is:

1. A programmable power supply which comprises:
   a switching power supply having an output;
   said switching power supply including a pulse modulator, a main power transformer, and means responsive to said pulse modulator for varying the input to the main power transformer;
   a linear power supply having an output;
   said linear power supply including an active element coupled to the output of said switching power supply;
   first feedback means responsive to the output of the active element for providing a first feedback signal;
   means for providing a voltage programming signal representing the voltage to be programmed;
   means for controlling the active element in response to said first feedback signal and said voltage programming signal;
   means for controlling said pulse modulator;
   second feedback means for providing a second feedback signal responsive to the voltage drop across said active element;
   said pulse modulator contol means being responsive to said first feedback signal and said second feedback signal; and
   means for controlling the output from said switching power supply in response to the output from said pulse modulator.

2. A programmable power supply as described in claim 1, said active element comprising a FET with the output from the main power transformer being coupled to the source/drain circuit of said FET and with said means for controlling the active element being coupled to the gate of said FET.

3. A programmable power supply as described in claim 1, said active element comprising a bipolar transistor with the output from the main power transformer being coupoled to the emitter collector circuit and said means for controlling the active element being coupled to the base thereof.

4. A programmable power supply as described in claim 1, said first feedback means including an open loop protection circuit.

5. A programmable power supply as described in claim 1, said means for controlling the active element comprising a voltage comparator and a drive circuit; means for feeding said first feedback signal to one input of the voltage comparator, means for feeding said voltage programming signal to another input of the voltage comparator, means for feeding the output of the voltage comparator to the drive circuit, and means for feeding the output of the drive circuit to a control electrode of said active element.

6. A programmable power supply as described in claim 1, said second feedback means comprising an electrical line connected to the input of said active element for feeding a signal representative of the voltage drop across the active element to the pulse modulator control means.

7. A programmable power supply as described in claim 6, said second feedback means also including a voltage divider in series with said electrical line.

8. A programmable power supply as described in claim 1, including means for providing a current programming signal representing the current to be programmed, means for sensing the output current of the power supply, and means for providing a third feedback signal responsive to said current programming signal, and means for controlling the active element in response to said third feedback signal.

9. A programmable power supply which comprises:
a switching power supply having an output;
said switching power supply including a pulse modulator, a main power transformer, and means responsive to said pulse modulator for varying the input to the main power transformer;
a linear power supply having an output;
said linear power supply including a FET;
means for rectifying and filtering the output of said main power transformer;
means for coupling the rectified and filtered output of the main power transformer to the source/drain circuit of said FET;
first feedback means responsive to the output of the FET for providing a first feedback signal, said first feedback means including an open loop protection circuit;
means for providing a voltage programming signal representing the voltage to be programmed;
means for controlling said FET in response to said first feedback signal and said voltage programming signal;
said means for controlling the FET comprising a voltage comparator and a drive circuit, means for feeding said first feedback signal to one input of the voltage comparator, means for feeding the voltage programming signal to another input of the voltage comparator, means for feeding the output of the voltage comparator to the drive circuit, and means for feeding the output of the drive circuit to the gate electrode of the FET;
means for controlling said pulse modulator;
second feedback means for providing a second feedback signal responsive to the voltage drop across said active element, said second feedback means comprising an electrical line connected to the input of said FET for feeding a signal representative of the voltage drop across said FET to the pulse modulator control means;
said pulse modulator control means being responsive to said first feedback signal and said second feedback signal; and
means for controlling the output from said switching power supply in response to the output from said pulse modulator.

10. A programmable power supply as described in claim 9, including means for providing a current programming signal representing the current to be programmed, means for sensing the output current of the power supply, and means for providing a third feedback signal responsive to said current programming signal, and said output current, and means for controlling the FET in response to said third feedback signal.

11. A programmable power supply which comprises:
a DC to AC inverter;
a main power transformer having a primary winding for receiving the output from said inverter and also having a secondary winding with an output;
means for rectifying and filtering the output voltage from said secondary winding;
an active element for receiving said rectified and filtered output;
first feedback means responsive to the output of said active element for providing a first feedback signal;
means for providing a voltage programming signal representing the voltage to be programmed;
means for controlling the active element in response to said first feedback signal and said voltage programming signal;
a first voltage comparator having an output;
second feedback means providing a second feedback signal responsive to the voltage drop across said active element;
said voltage comparator being responsive to said first feedback signal and said second feedback signal;
a pulse modulator having an output;
means for controlling said pulse modulator in response to the output from said first voltage comparator; and
means for controlling said DC to AC inverter in response to the output from said pulse modulator.

12. A programmable power supply as described in claim 11, including means for connecting the power supply to an AC source; means for rectifying and filtering the AC from the AC source; and means for feeding the rectified and filtered AC to said DC to AC inverter.

13. A programmable power supply as described in claim 11, said active element comprising a FET with the rectified and filtered output from said secondary winding being coupled to the source/drain circuit of said FET and with said means for controlling the active element coupled to the gate of said FET.

14. A programmable power supply as described in claim 11, said active element comprising a bipolar transistor with the rectified and filtered output from said secondary winding being coupled to the emitter/collector circuit and said means for controlling the active element being coupled to the base thereof.

15. A programmable power supply as described in claim 11, said first feedback means including an open loop protection circuit.

16. A programmable power supply as described in claim 11, said means for controlling the active element comprising a second voltage comparator and a drive circuit, means for feeding said first feedback signal to one input of the second voltage comparator, means for feeding said voltage programming signal to another input of the second voltage comparator, means for feeding the output of said second voltage comparator to the drive circuit, and means for feeding the output of the drive circuit to a control electrode of said active element.

17. A programmable power supply as described in claim 11, said second feedback means comprising an electrical line connected to the input of said active element for feeding a signal representative of the voltage drop across the active element to the first voltage comparator.

18. A programmable power supply as described in claim 17, said second feedback means also including a voltage divider in series with said electrical line.

19. A programmable power supply as described in claim 11, said means for controlling said pulse modulator comprising means for modulating the duty cycle of the output pulses from the pulse modulator to thereby vary the output voltage from said inverter.

20. A programmable power supply as described in claim 11, including means for providing a current programming signal representing the current to be programmed, means for sensing the output current of the power supply, and means for providing a third feedback signal responsive to said current programming signal, and said output current, and means for controlling the active element in response to said third feedback signal.

21. A programmable power supply which comprises:
a DC to AC inverter;
a main power transformer having a primary winding for receiving the output from said inverter and also having a secondary winding with an output;
means for rectifying and filtering the output voltage from said secondary winding;
a FET for receiving said rectified and filtered output from said secondary winding, with the output from said secodary winding being coupled to the source/drain circuit of said FET;
first feedback means responsive to the output of said FET for providing a first feedback signal;
means for providing a voltage programming signal representing the voltage to be programmed;
means for controlling the FET in response to said first feedback signal and said voltage programming signal;
a voltage comparator having an output;
second feedack means for providing a second feedback signal responsive to the voltage drop across said FET, said second feedback means comprising an electrical line connected to the input of said FET for feeding a signal representative of the voltage drop across the FET to said voltage comparator;
said voltage comparator being responsive to said first feedack signal and to said second feedback signal representative of the voltage drop across the FET;
a pulse modulator having an output;
means for controlling said pulse modulator in response to the output from said voltage comparator;
means for controlling said DC to AC inverter in response to the output from said pulse modulator;
means for providing a current programming signal representing the current to be programmed;
means for sensing the output current of the power supply;
means for providing a third feedback signal responsive to said current program signal and said output current; and
means for controlling said FET in response to said third feedback signal.

22. A programmable power supply which comprises:
a switching power supply having an output;
said switching power supply including a pulse modulator, a main power transformer, and means responsive to said pulse modulator for varying the input of said main power transformer;
a linear power supply having an output;
said linear power supply including an active element coupled to the output of said switching power supply;
first feedback means responsive to the output of the active element for providing a first feedback signal;
means for providing a current programming signal representing the current to be programmed;
means for sensing the output current of the power supply;
means for providing a second feedback signal responsive to said current programming signal and said output current;
means for controlling the active element in response to said second feedback signal;
means for controlling said pulse modulator;
third feedback means for providing a third feedback signal responsive to the voltage drop across said active element;
said pulse modulator controlling means being responsive to said first feedback signal and said third feedback signal; and
means for controlling the output from said switching power supply in response to the output from said pulse modulator.

23. A programmable power supply as described in claim 22, including means for providing a voltage programming signal representing the voltage to be programmed, and means for controlling the active element in response to said first feedback signal and said voltage programming signal.

24. A programmable power supply as described in claim 22, in which said pulse modulator comprises a pulse width modulator.

25. A programmable power supply as described in claim 22, in which said pulse modulator comprises a frequency modulator.

26. A programmable power supply which comprises:
a switching power supply;
a linear power supply coupled to the output of said switching power supply and including an active element having a control electrode for enabling varying of its conduction;
first feedback means for providing a first feedback signal responsive to the output of said linear power supply;
second feedback means for providing a second feedback signal responsive to the voltage drop across said active element;

means for providing a programming signal;

means coupled to said control electrode for varying the conduction of said active element in response to said first feedback signal and said programming signal; and means for controlling the output of said switching power supply in response to said first feedback signal and said second feedback signal.

27. A programmable power supply as described in claim 26, said active element comprising a FET with said control electrode comprising the gate of said FET.

28. A programmable power supply as described in claim 26, said second feedback means comprising an electrical line connected to the input of said active element.

29. A programmable power supply as described in claim 26, said switching power supply comprising a DC to AC inverter, a main power transformer having a primary winding for receiving the output from said inverter and also having a secondary winding, a pulse width modulator, and means for controlling said DC to AC inverter in response to the output from said pulse width modulator.

30. A programmable power supply as described in claim 29, and further including a voltage comparator the output of which is coupled to said pulse width modulator to control said pulse width modulator, means for coupling said first feedback means to said voltage comparator and means for coupling said second feedback means to said voltage comparator.

* * * * *